US006649916B2

United States Patent
Orr et al.

(12) United States Patent
(10) Patent No.: US 6,649,916 B2
(45) Date of Patent: Nov. 18, 2003

(54) ION MONITORING

(75) Inventors: Christopher Henry Orr, Calderbridge (GB); Craig Janson Luff, Calderbridge (GB); Thomas Dockray, Calderbridge (GB); Duncan Whittemore Macarthur, Los Alamos, NM (US)

(73) Assignee: British Nuclear Fuels PLC, Risley (GB)

( * ) Notice: Subject to any disclaimer, the term of this patent is extended or adjusted under 35 U.S.C. 154(b) by 0 days.

(21) Appl. No.: 10/163,437

(22) Filed: Jun. 4, 2002

(65) Prior Publication Data

US 2002/0166974 A1 Nov. 14, 2002

Related U.S. Application Data (63) Continuation of application No. 09/930,899, filed on Aug. 15, 2001, now abandoned, which is a continuation of application No. 09/307,228, filed on May 7, 1999, now abandoned.

(30) Foreign Application Priority Data

May 8, 1998 (GB) .............................................. 9809748
May 8, 1998 (GB) .............................................. 9809749

(51) Int. Cl.[7] .............................................. H01J 47/02
(52) U.S. Cl. ...................................... 250/374; 250/326
(58) Field of Search ................................ 250/374, 326, 250/394, 380, 387

(56) References Cited

U.S. PATENT DOCUMENTS

| | | | | |
|---|---|---|---|---|
| 4,264,816 A | * | 4/1981 | Walenta ....................... 250/374 |
| 4,740,730 A | | 4/1988 | Uda et al. ................. 315/84.51 |
| 4,814,608 A | | 3/1989 | Dempsey et al. ........... 250/253 |
| 4,853,536 A | | 8/1989 | Dempsey et al. ........... 250/253 |
| 4,859,854 A | | 8/1989 | Kershner et al. ........... 250/374 |
| 4,992,658 A | | 2/1991 | Ramsey, Jr. et al. ........ 250/253 |
| 5,008,540 A | | 4/1991 | Dempsey ................. 250/336.1 |
| 5,053,624 A | | 10/1991 | Kronenberg ............. 250/385.1 |
| 5,055,674 A | | 10/1991 | Kotrappa ..................... 250/255 |
| 5,059,803 A | * | 10/1991 | Kronenberg ............. 250/385.1 |
| 5,107,108 A | | 4/1992 | Ramsey et al. ............. 250/253 |
| 5,126,567 A | | 6/1992 | Dempsey et al. ........ 250/336.1 |
| 5,128,540 A | | 7/1992 | Stieff ......................... 250/255 |
| 5,184,019 A | | 2/1993 | MacArthur et al. ......... 250/380 |
| 5,187,370 A | | 2/1993 | MacArthur et al. ......... 250/379 |
| 5,194,737 A | | 3/1993 | MacArthur et al. ......... 250/382 |
| 5,281,824 A | | 1/1994 | MacArthur et al. ......... 250/380 |
| 5,311,025 A | | 5/1994 | MacArthur et al. ......... 250/374 |
| 5,426,305 A | * | 6/1995 | Siebentritt et al. .......... 250/374 |
| 5,514,872 A | | 5/1996 | Bolton et al. ............... 250/380 |
| 5,525,804 A | | 6/1996 | MacArthur et al. ......... 250/374 |
| 5,550,381 A | * | 8/1996 | Bolton et al. ............... 250/380 |
| 5,663,567 A | | 9/1997 | Steadman et al. .......... 250/382 |
| 5,679,958 A | | 10/1997 | MacArthur ................. 250/382 |
| 5,877,502 A | | 3/1999 | Koster et al. ............... 250/382 |

FOREIGN PATENT DOCUMENTS

| | | | |
|---|---|---|---|
| GB | 1090745 | 3/1965 | ..................... 30/39 |
| WO | WO 98/38531 | 9/1998 | ..................... 185/1 |

* cited by examiner

*Primary Examiner*—David Porta
*Assistant Examiner*—Christine Sung
(74) *Attorney, Agent, or Firm*—Workman Nydegger (57) ABSTRACT

The apparatus and method provide a technique for significantly reducing capacitance effects in detector electrodes arising due to movement of the instrument relative to the item/location being monitored in ion detection based techniques. The capacitance variations are rendered less significant by placing an electrically conducting element between the detector electrodes and the monitored location/item. Improved sensitivity and reduced noise signals arise as a result. The technique also provides apparatus and method suitable for monitoring elongate items which are unsuited to complete enclosure in one go within a chamber. The items are monitored part by part as the pass through the instrument, so increasing the range of items or locations which can be successfully monitored.

35 Claims, 4 Drawing Sheets

ION MONITORING

CROSS-REFERENCE TO RELATED APPLICATIONS

This application is a continuation of U.S. patent application Ser. No. 09/930,899, filed Aug. 15, 2001 now abandoned, which is a continuation of patent application Ser. No. 09/307,228, filed May 7, 1999, abandoned, which claims priority to Great Britain Application Nos. 9,809, 748.8, filed May 8, 1998 and 9,809,749.6, filed May 8, 1998 which applications are incorporated herein by reference.

BACKGROUND OF THE INVENTION

1. The Field of the Invention

This invention is concerned with improvements in and relating to ion detectors and particularly, but not exclusively to detectors in which the detector moves relative to the ion source. Relative movement may arise due to movement of the detector and/or due to movement of the ion source, for instance due to passage of the item carrying the source through the detector.

2. The Relevant Technology

The monitoring of alpha emissions from an item or location is of particular significance during decommissioning, material accounting and a variety of other applications.

The long range detection of alpha emissions, indirectly, through the monitoring of air ions generated by the passage of alpha particles is known. The item believed to be carrying the alpha sources is placed in a container, the container completely enclosing the item so as to exclude ambient ions. The ions generated by alpha particles are attracted to electrode(s) in the detector system and a current arises as a result.

The very small size of this current makes it prone to interference from noise currents arising due to other variables in the system. Movement of the detector electrode relative to the source of the alpha particles causes significant changes in the system capacitance and significant noise currents as a result.

BRIEF SUMMARY OF THE INVENTION

The present invention aims to provide a detector system which is far less prone to noise interference, even where the detector is actively moved relative to the source, for instance when mounted on a vehicular survey system or, for instance, when an elongate item is moved through the detector during monitoring.

According to a first aspect of the invention we provide an instrument for detecting ions originating from a monitored location, the instrument having a body portion and one or more electrodes at an electrical potential relative to the monitored location, and one or more electrically conducting element(s) provided with one or more apertures, the element (s) being provided between the electrode(s) and the monitored location and further comprising means to monitor ions discharged on the electrode(s).

The element(s) are preferably provided with a large number of apertures, for instance greater than 80% of their effective area as apertures. The element may be in the form of a grid. A single metal element is preferred.

The element(s) may be planar. A single continuous element or a plurality of elements may be provided.

The element may be at a different potential to the location, including item, being monitored. The element may be earthed. The element may have an applied potential or an electrostatic potential.

The element may be provided across the full extent of the electrode(s), or at least a substantial part thereof. Preferably the configuration of the element mirrors that of the electrode (s), for instance a planar electrode may be provided together with a planar element or grid.

The element may be provided at a significant separation from the location/item to be monitor, for instance greater than 5 cm, greater than 10 cm and even greater than 20 cm.

Equally the element may be provided in proximity to the location/item to be monitored, for instance less than 5 cm and more preferably less than 1 cm from the closest surface of the item.

The instrument may be provided with a plurality of detection electrodes. The electrode(s) may be provided close to or away from the element. A continuous detector electrode may be used, such as a plate. A discontinuous detector may be used, such as an apertured plate or grid.

Preferably an electrical potential is applied to the electrode(s). An electrical potential may be provided electrostatically. The potential is preferably higher than that applied to the element. The potential of the element may be lower than that of the electrode(s), but higher than that of the location/item. The location/item and element may both be grounded.

The ions may be attracted to the electrode(s) electrostatically by the electric field. Alternatively or additionally air flow within the instrument from the location were ions are generated into proximity with the electrode(s) may be promoted. A fan may be used to promote the movement of ions to the electrode(s).

The electrode(s) may be provided within a continuous enclosure with a closeable opening for introducing the item to be monitored. A support may be provided within the enclosure for the item so as to maximize the surface area in contact with air. Preferably means to promote air flow around the item are provided. Preferably the air flow circulates within the sealed enclosure.

The electrode(s) may be provided within an enclosure which is open to its surroundings on at least a portion of one side. The enclosure may be in the form of a hood with an open side. Such an enclosure is suited to monitoring large areas or surfaces, such as floors and walls. The perimeter of the opening may be provided with a laterally extending flange. The lateral extent of the flange is preferably greater than the gap between the flange and surface. An extent at least 5 times and more preferably 10 times is provided. Preferably the flange is provided around the opening. Preferably a planar flange, opposing the surface to be monitored is provided.

The location to be monitored may be a surface, such as a wall, ceiling or floor, including these of a building, room or vessel; or a surface of a piece of equipment, such as a glove box, tank or vessel. Monitoring of open ground, rubble and soil is possible. The location to be monitored may be material passing the detector on a conveyor system.

The item to be monitored may be a piece of equipment, or a part thereof, such as a pump, pipe, beam, glove box, tool, filter, cable, rod or the like.

The item/location may be placed within the instrument and/or placed against and/or in proximity to the instrument.

Preferably the item/location is electrically grounded.

The item/location may be moved relative to the instrument, for instance a beam on a roller bed or soil on a conveyor belt and/or the instrument may be moved relative to the location/item, for instance a vehicularized instrument moved across a stretch of ground.

The means for monitoring ion discharge preferably comprises current monitoring, and more preferably current measuring means. The means for monitoring ion discharge may comprise means for monitoring the remaining electrostatic potential, such as surface charge monitors.

The current monitoring means is preferably an electrometer, most preferably the electrometer is provided as a floating input electrometer. The electrometer may be provided as a ground referenced electrometer.

An additional detector may be provided in the instrument to detect background ion levels. The additional detector may comprise an electrode and an apertured element. Preferably the additional detector electrode is separated from the electrode by a guard plate.

Preferably an equivalent potential is applied to the electrode and the background electrode. Preferably an equivalent potential is present for the element and the background element.

The ions may originate from the location directly or indirectly. Preferably the ions are generated by alpha particles, most preferably alpha particles emitted from material on or at the location being monitored.

According to a second aspect of the invention we provide a method of detecting ions originating from a monitored location, the method comprising providing one or more electrode(s) at an electrical potential relative to the location so as to attract at least some of the ions to the electrode, and additionally providing one or more electrically conducting element(s) with one or more apertures therein to allow the passage of ions, between the electrode(s) and the monitored location, the discharge of ions on the electrode(s) being monitored.

Other features, options, possibilities and details provided in the first aspect of the invention and/or elsewhere in this document are included in the possibilities for the second aspect of the invention.

According to a third aspect of the invention we provide an instrument for monitoring alpha emitting sources on an item, the instrument comprising a detecting chamber defining a detecting volume, the detecting chamber being provided with an inlet through which the item can be introduced and an outlet through which the item leaves the detecting chamber, the detecting chamber being provided with one or more electrodes for collecting ions produced in the detecting volume by the portion of the item in the detecting volume, the instrument further being provided with means to monitor ions discharged on the electrode(s).

In this way the monitoring of items considerably longer than the detecting volume, and indeed the instrument, is possible.

The detection chamber may be provided with one or more electrodes opposing the portion of the item within the detection volume. A single electrode surrounding the portion of the item is preferred.

The electrode(s) are preferably configured to the cross-sectional profile of the item being monitored. A cylindrical electrode may be provided, most preferably with its axis aligned with the axis of the item and/or instrument.

An applied, preferably externally generated, potential may be employed or an electrostatic potential may be employed.

Preferably the voltage gradient between different portions of the electrode(s) and the portion of the item is substantially constant for different portions of the electrode and of the item.

The detection chamber may be provided with one or more pairs of opposing detection electrodes. Preferably the electrodes of a pair are provided such that the item passes between them. A potential difference between the opposing electrodes of a pair may be provided in use. Preferably a potential difference between the item and at least one of the electrodes is provided in use. An applied or electrostatic potential may be employed.

The chamber is preferably provided with an inlet and outlet on a common axis. The chamber may be cylindrical. The inlet and/or outlet may be provided in the end wall(s) of a right cylinder.

The inlet and/or outlet may lead to a further chamber externally provided to the detecting chamber. The further chamber(s) may be provided with an opening to the surrounding environment. Preferably the further chamber aperture is axially aligned with the aperture (inlet/outlet) into the detecting chamber. Most preferably the aperture of the inlet further chamber, the inlet to the chamber, the outlet from the chamber and the aperture in the outlet further chamber are all axially aligned.

The detecting chamber may have an inlet closed to the passage of ions from outside the chamber to inside the chamber and/or an outlet closed to the passage of ions from outside the chamber to inside the chamber.

The inlet and/or outlet further chambers may have an internal configuration approximately conforming to the external configuration of the item. A limited clearance, most preferably over a significant length may be provided between the internal surface of the further chamber(s) and the external surface of the item. The clearance may be less than 5 mm and more preferably less than 2 mm. The significant length may be greater than 10 cm and more preferably greater than 25 cm. The length may be at least 5 times, more preferably at least 10 times and ideally at least 20 times the minimum clearance presented.

The detection chamber may be provided with alternative means for excluding ambient ions. The atmospheric pressure in the detection chamber may be higher than the ambient atmospheric pressure.

The means for monitoring ions discharged on the electrode(s) may comprise electrostatic charge monitoring means. Preferably the means for monitoring ions discharged on the electrode(s) comprise current indicating means and more preferably current measuring means. A ground referenced electrode may be provided.

Preferably one or more of the electrodes is connected to an electrometer.

The item may be a continuous item of more than 5 cm, preferably of more than 10 m, more preferably more than 20 m and potentially 50 m or more in length.

The item may be a discrete item such as a pipe, beam (such as an I beam), pole, fuel element, cladding, cable, wire, rail or other elongate or large item or a surface, such as a material traveling on a conveyor.

The instrument may be provided with associate means for supporting the item and/or moving the item through the instrument. Such means may be provided on both sides of the instrument.

The instrument may be provided with means for supporting it on the item to be monitored. The support means may enable the instrument to be moved along and/or over the item.

According to a fourth aspect of the invention we provide a method of monitoring alpha emitting sources on an item, the method comprising introducing the item through an inlet connected to a detecting chamber in an instrument and removing the item through an outlet in the instrument, the detecting chamber defining a detecting volume and being provided with one or more electrodes for discharging ions produced in the detecting volume by the portion of the item in the detecting volume, the method including monitoring ions discharged on the electrode(s).

The item may be introduced by moving the item into the detector and/or by moving the detector along the item.

The fourth aspect of the invention includes the features, options and possibilities set out elsewhere in this application, including the steps necessary to implement them.

It is particularly preferred that the third or fourth aspects of the invention include the various options, features and possibilities set out above for the electrically conducting elements provided with one or more apertures which are provided between the electrode or electrodes and the monitoring location.

BRIEF DESCRIPTION OF THE DRAWINGS

Various embodiments of the invention will now be described, by way of example only, and with reference to the accompanying drawings in which.

DETAILED DESCRIPTION OF THE PREFERRED EMBODIMENTS

The monitoring of alpha and/or beta and/or gamma emissions from a location or item is of particular significance during decommissioning, material accounting and a variety of other applications. An accurate calculation of the level of contamination present enables the correct decision to be taken in classifying items/locations in terms of grade or the most suitable decontamination process.

Figures 1, 2:
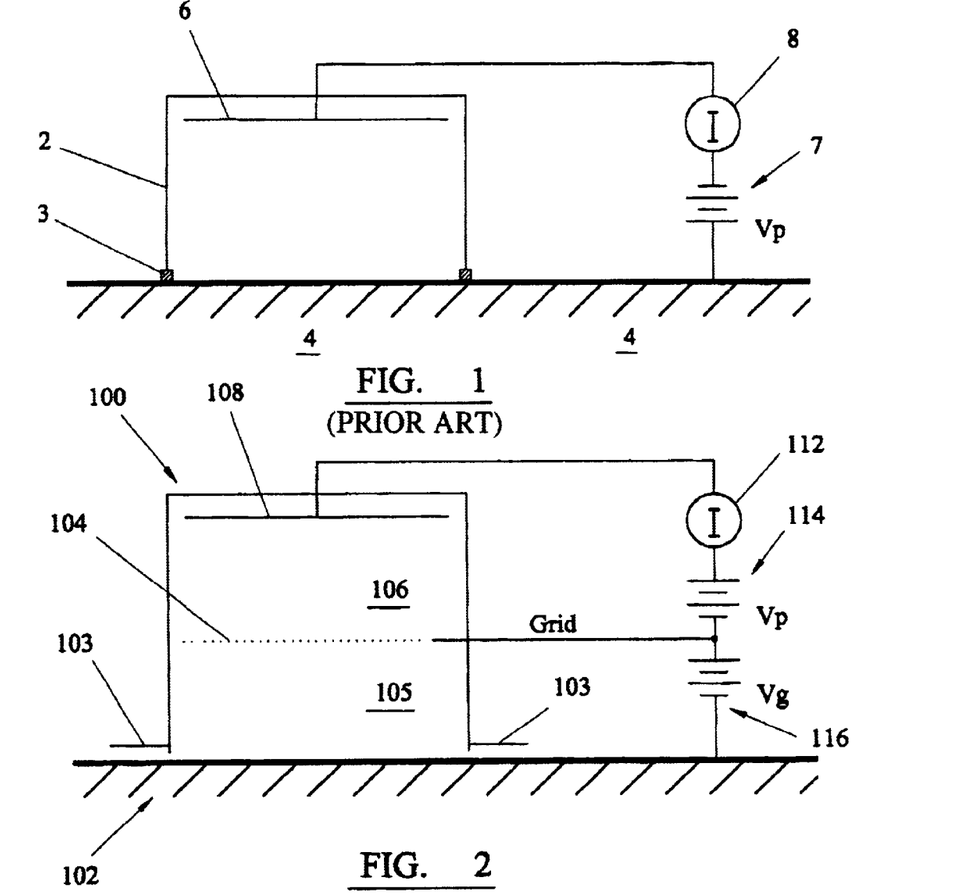
FIG. 1 illustrates schematically a prior art alpha detection instrument.
FIG. 2 illustrates an instrument according to a first embodiment of the present invention.

Alpha determination for locations, such as floors, are known in terms of the type of instrument schematically illustrated in FIG. 1.

The instrument uses the principal that when direct alpha particle detection is not practicable, detection of alpha particles emitted into air from the location can successfully be indirectly monitored. Whilst alpha particles only travel a few centimeters in air and, as a consequence, a detector unit at any distance from the item cannot detect alpha particles directly, during the course of their travel through the air the alpha particles cause ionisation of a significant number of air molecules. These ionized molecules remain in that state for a substantial period of time and this is sufficient to enable them to be attracted/drawn from in proximity with the location to a detector array.

Thus in the instrument of FIG. 1 a hood style container 2 is placed over a floor location 4 to be monitored with the edge 3 of the container in contact with the floor. The container is open to the floor 4 and contains a detector array 6 which employs an electric potential $V_P$, from source 7, so as to attract the charged ions generated by alpha emission from the floor 4 to the plate of the detector array 6. The current resulting from these ions is detected by an electrometer 8 so as to give a measure of the ion level presence and hence the alpha contamination presence.

To obtain an accurate reading it is necessary to place such an instrument at the desired location and then wait for a significant period of time for vibrations arising from the movement to settle down. While such systems function, therefore, they and a variety of other instruments based around this principal suffer problems where the instrument is moved relative to the location being monitored. The instrument and/or the location may actually be moved, but the problem is the same in each case.

Whenever a location, in a grounded state, moves relative to the detector array, at an applied potential, capacitance changes occur which effect the instrument's detection capabilities through the generation of high noise levels. The problem is particularly acute for detectors of the FIG. 1 type; those involving systems in which ions are attracted towards an electrode by the application of an applied potential of opposing polarity. The capacitance changes result in a noise current, whose value is determined by the expression:

$$I\frac{dQ}{dt} = V\frac{dC}{dt} \text{ (for constant } V\text{)}$$

Since the capacitance of the detector is directly related to the distance from the electrode in the detector to the grounded object, variations in the distance cause a directly proportional noise current.

The problem is addressed in the present invention by providing an electrically conducting grid between the electrode of the detector and the item/location. This has the effect that the relevant capacitance for noise purposes becomes that of the electrode and grid system. The spacing of these two components is far more consistent than between the electrode and the object and the variation in capacitance and hence the noise current is greatly reduced as a result.

The use of a grid, however, as opposed to a solid plate, ensures that the ion collection, necessary to make the alpha particle level determination, is not significantly hindered.

In the embodiment of the invention illustrated in FIG. 2 the instrument 100 is held in close proximity to the location 102 to be monitored. So as to exclude extraneous ions present in the surrounding air as far as possible a limited gap due to skirt 103 is provided.

Movement of the item 102 past the instrument 100 or movement of the instrument 100 along the item 102 would cause capacitance problems with the prior art, but in this embodiment a grid 104 is placed inside the volume defined by the instrument 100. The grid 104 is placed between the item 102 and the detector plate 108. The grid 104 is electrically connected to the detector plate 108.

The detector plate 108 is electrically connected to provide an applied potential $V_P+V_G$ due to source 114 and source 116 through a floating input electrometer 112. The grid 104 is also electrically connected to provide a lower applied potential $V_G$, due to source 116 alone, than that for the detector plate 108. The item 102 is grounded.

Alpha emitting sources present on the item 102 emit alpha particles which in turn stop within the volume 105 below the grid 104 and generate ions as they pass. The applied potential electrostatically attracts the ions through the grid 104, into volume 106 and hence to the detector plate 108 where they give rise to a current. The current is in turn detected by the electrometer 112 and the value is used to calculate the level of alpha contamination present.

The grid 104 in this embodiment is positioned at a distance from the item 102 greater than the penetration distance in air of alpha particles, generally greater than 5 cm. In this way no alpha particles, only ions, reach the grid 104.

Figure 3:
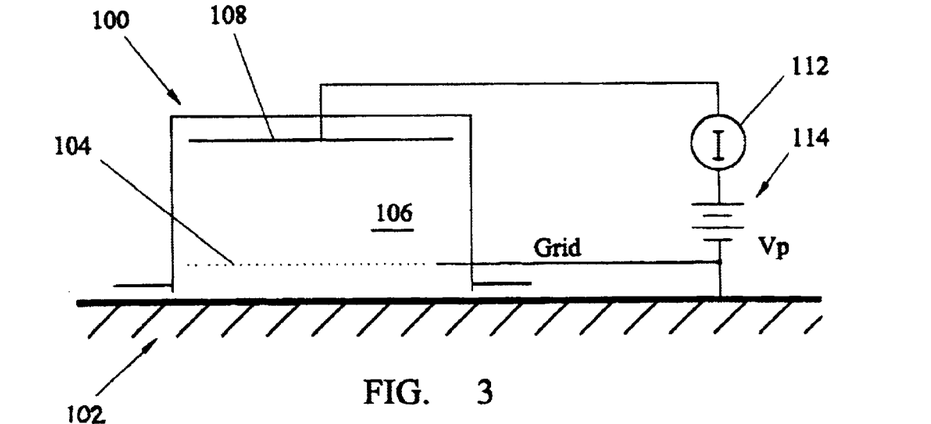
FIG. 3 illustrates a second embodiment of the invention.

In the second embodiment of the invention, illustrated in FIG. 3 a similar arrangement of instrument 100, item 102, volume 106, detector plate 108 and applied potential $V_P$ from source 114 for the detector plate, together with an electrometer 112 are employed. In this embodiment, however, the grid 104 is positioned in close proximity to the surface of the item 102 under consideration. Additionally the grid 104 is itself grounded. A system provided in this way allows a ground reference electrometer to be used.

Alpha emission sources on the item 102 emit alpha particles which pass through the grounded grid 104 and enter the volume 106 between the grid 104 and detector plate 108 where they stop and cause the ionisation which is to be detected.

The item 102 could be a wall or floor of a building or construction or a piece of land or soil. The item 102 under consideration in such systems could equally well be a pipe, I-beam, pump or other piece of equipment, as described in more detail below.

Figure 4:
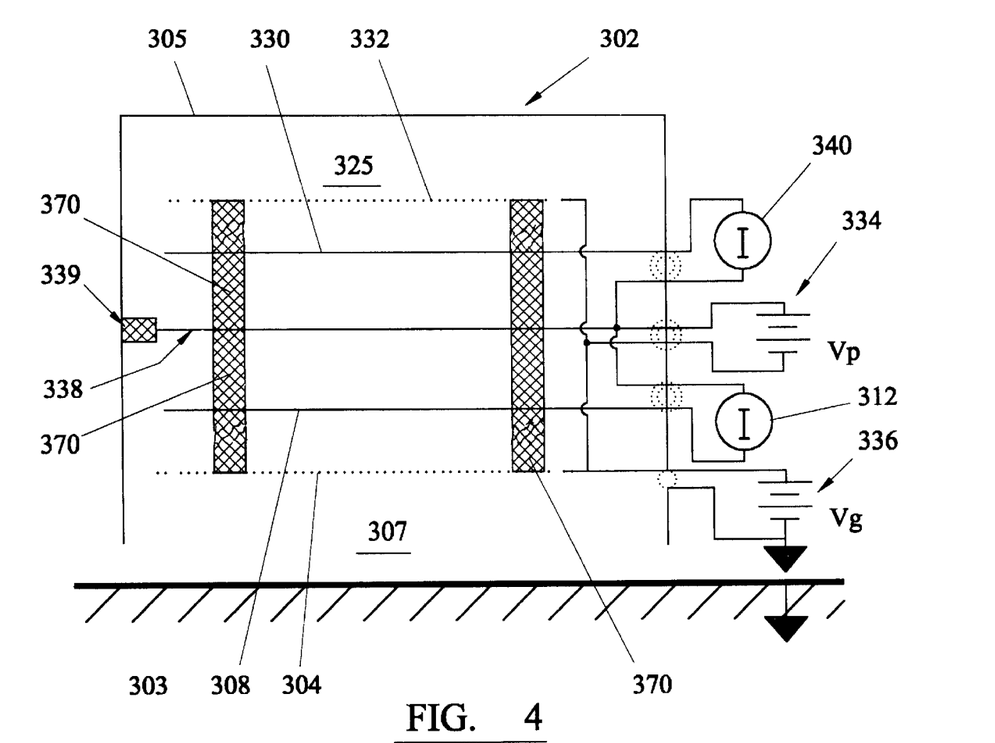
FIG. 4 illustrates a third embodiment of an instrument according to the present invention.

The third embodiment of the invention illustrated in FIG. 4, as is possible for all of the embodiments described above, has been modified to provide a background canceling instrument.

The instrument 302 consists of an enclosure 305 defining a volume 307 which is in proximity with the surface 303 to be monitored. Limited clearance or other means are employed to exclude as far as possible extraneous ions present in the outside air from volume 307.

The volume 307 contains a front detection plate 308 and a front grid 304. The plate 308 is at a potential $V_P+V_G$ due to sources 334, 336 and the grid 304 is at a lower potential, potential $V_G$ due to source 336 alone.

The back volume 325 of the instrument is similarly provided with a back detection plate 330 and a back grid 332. Equivalent voltages to $V_P+V_G$ and $V_G$ are applied to the back plate 33 and the back grid 332 respectively. A common potential source 336 is used in this regard for the grids 304, 332, together with a common potential source 334 for the detector plates 308, 330 and the ground plate 338.

Between the two detection plates 308, 330 a guard plate 338, to exclude location ions from the background count, is provided mounted on a mechanical support 339.

The plates 308, 338, 330 and grids 304, 332, are spaced by insulators 370.

Each detector plate 308, 330 is connected to an electrometer 312, 340 respectively, and a current reading for each detector is obtained as a result. The background, electrometer 340, can be subtracted from the item+background value, electrometer 312, to give an absolute item value using software.

The embodiments of the invention described above address alpha particle determinations but it is perfectly possible to incorporate gamma and/or beta detectors in such an instrument alternatively or additionally. The gamma detectors may be of the thick plastic scintillator type, sodium iodide type or semi-conductor type. Beta detection can be undertaken directly or alternatively by calculation from the gamma emissions recorded.

To demonstrate the effectiveness of the technique presented by the present invention a plate detector in a hood container was positioned at a spacing of 55 mm from a surface, without a grid, and one corner of the surface was moved at a rate of 0.5 mms$^{-1}$.

Figure 5:
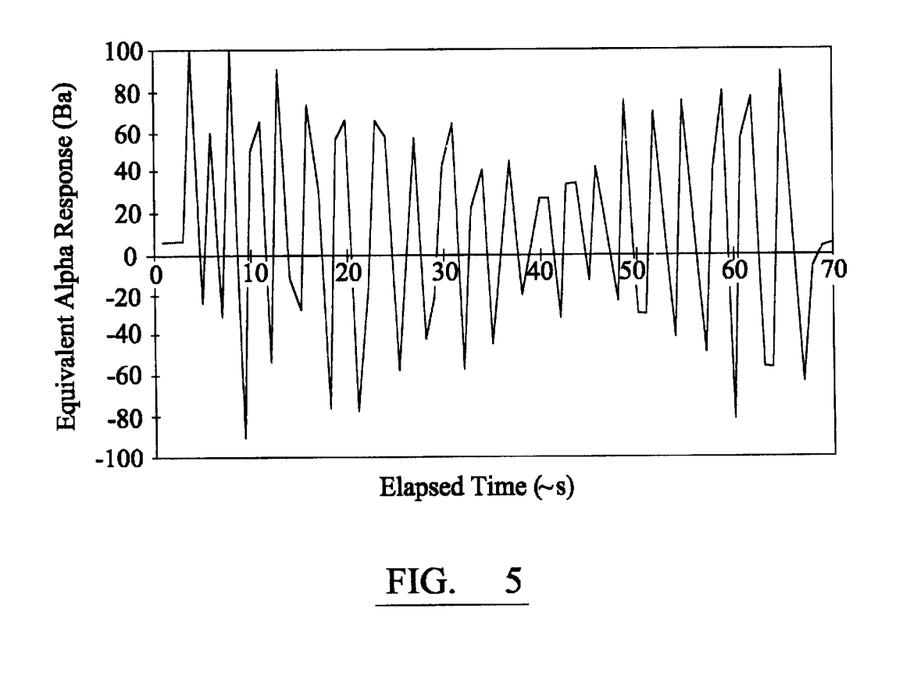
FIG. 5 illustrates the signal expressed in equivalent alpha response against time for a prior art instrument moved relative to the location being monitored.

The results obtained for the current signal, and shown in FIG. 5, give a calculated limit of detection of 210 Bq due to the noise present in the signal and generated by the movement.

Figure 6:
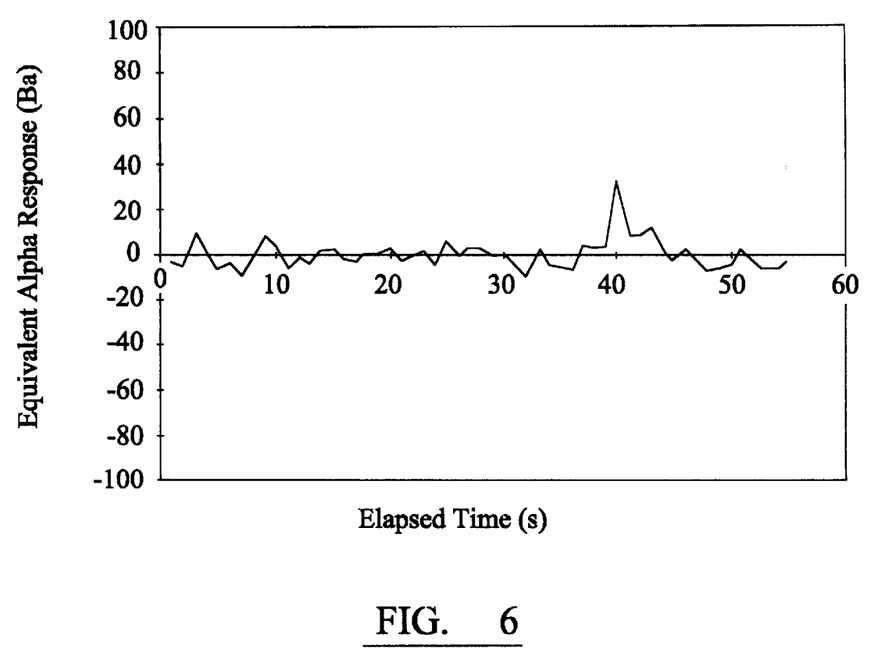
FIG. 6 indicates the results on an equivalent basis to those of FIG. 5 but for an instrument according to the present invention.

The apparatus was then provided with an earthed grid of 1 cm squares, between the detector plate and the source. A test with a 55 mm spacing from the surface and a higher rate of movement, 1 mms$^{-1}$, gave the results of FIG. 6. The substantial removal of noise gave a limit of detection of 18 Bq.

Figure 7:
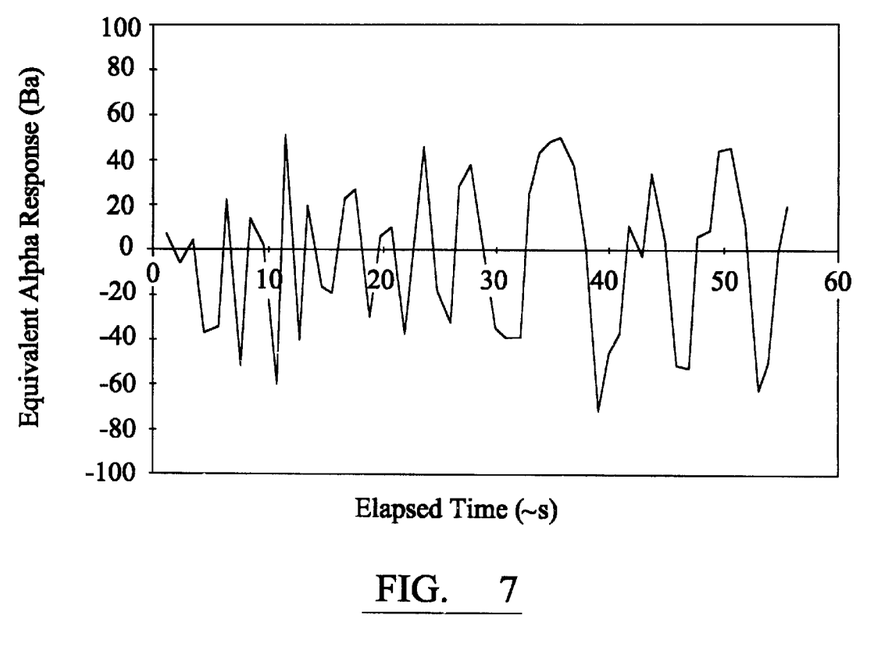
FIG. 7 illustrates the results on an equivalent basis to FIGS. 5 and 6 but for an instrument according to the present invention at a higher rate of movement.

A further test with a far higher level of movement, 20 mms$^{-1}$, was performed (again using a gridded detector) and produced the signal results set out in FIG. 7. Even for this level of movement the limit of detection, 149 Bq, was still significantly lower than for the ungridded detector even at low movement.

As previously discussed, long range alpha detection techniques based on detecting ions have previously been concerned with enclosures for areas or items to be monitored. This renders them suitable for relatively small or flat items, but prevents the technique being suitable for analyzing longer items which cannot practically be enclosed within the detection instrument in the manner of FIG. 1, for instance.

Figure 8:
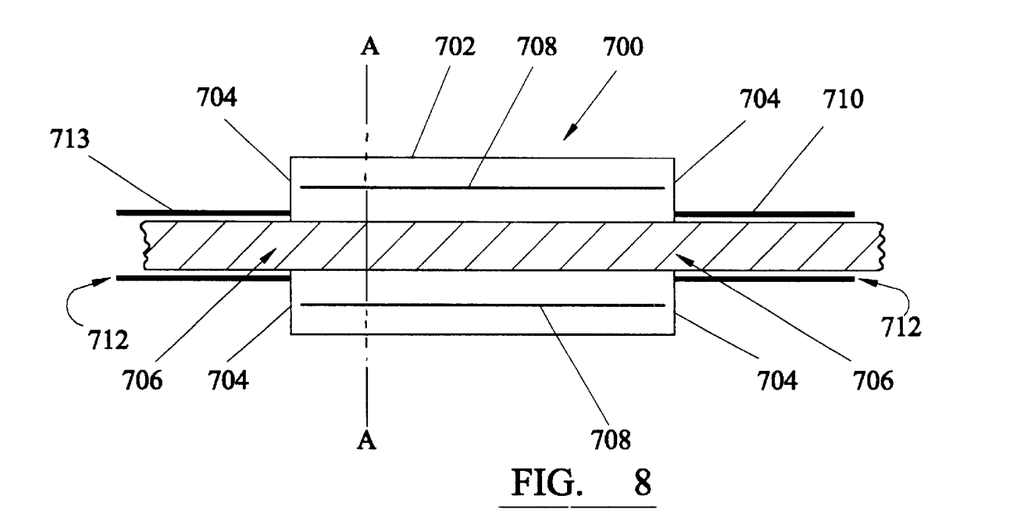
FIG. 8 illustrates an instrument according to a further embodiment of the present invention.

To successfully monitor long items, including I-section beams and other elongate items, a detector of the type embodying the invention is preferred, as illustrated in FIG. 8. Such instruments preferably include the grid between the item being monitored and detector to reduce variation in capacitance and hence reduce noise in the detector signal.

The instrument 700 according to the first embodiment of the invention comprises an elongate central portion 702 of cylindrical cross-section. The cylinder 702 is provided with end faces 704 which define apertures 706 lying on the axis of the cylinder 702. The apertures 706 allow the passage of an elongate item to be measured through the cylinder 702.

Figure 9:
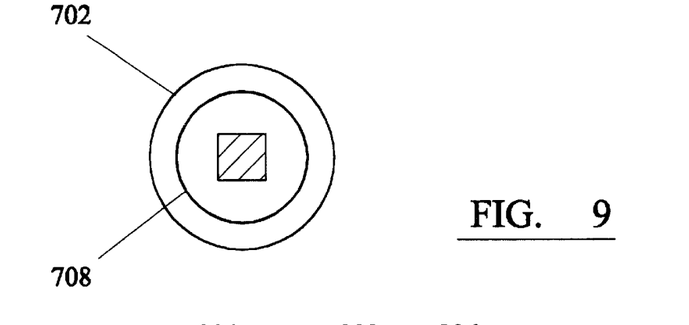
FIG. 9 illustrates a cross-section through FIG. 8 along line AA.

The cylinder 702 is itself provided with a cylindrical electrode 708 spaced, and thereby electrically insulated, from the cylinder wall 702, see FIG. 9. The electrode has an known electric potential applied to and as a consequence ions generated in the cylinder 702 are drawn away from the item to the electrode 708. The ions generated by alpha emission from the article and attracted to the electrode 708 give rise to a current which can be measured using an electrometer, not shown.

This monitoring technique is effective even during the continuous movement of the item through the instrument.

Capacitance of variations due to the relative movement of the detector electrode and item can be mitigated to a very large degree by including a grid, not shown, between the electrode 708 and the item, shown in cross hatching. The grid may have a corresponding profile to the electrode 708 and/or to the item.

The above embodiment employs a cylindrical electrode to monitor, preferably, cylindrical items, but the electrode array can be configured to the particular type of item under consideration. Thus an I beam cross-section could be monitored using electrodes spaced from the end surfaces and closer together electrodes space from the intervening web portion. Uniform spacing from the item is preferred.

As ambient air includes extraneous ions of its own it is desirable to exclude these from detection at the electrode 708 to give a truer measurement of the alpha particle generated ionisation. The detection currents employed are around $10^{-12}$A and as a consequence easily distorted by extraneous ions.

In some prior art systems featuring closed containers this was readily achievable by a filter which closed off the air flow route into the container. This option, however, is not viable where the elongate item exceeds the length of the measuring chamber 702 thus rendering filters over the air inlet impractical.

To physically counteract this problem the present invention provides for a further body portion 710 on each end of the cylinder 702. These body portions 710 extend from the end faces 704 of the cylinder 702 for a substantial length to ends 712 of their own. The aperture 713 through the body portion 710, which allows access for the elongate item to be measured, takes a form closely configured to that of the item itself, for instance a pipe (the item) passing down a slightly larger pipe (the inlet). This structure gives minimal air flow and hence minimal flow of ions into the detection chamber.

In an alternative form, not shown, the ambient ions can be excluded by a slight positive pressure within the detecting chamber and/or further chambers, which promote air flow out of the instrument. Other forms, not shown, exclude ambient ions using an extended restricted clearance between the item/location and the inlet and outlet passage, for instance flexible air excluders, such as brushes, may be provided.

In a still further alternative form the "background" ions present in the air around the unit can be determined in advance of the item's passage through the instrument and/or afterwards to provide a base count which can be deducted to give a measurement of the ions arising from alpha particle emission. Such background determinations could be made with a clean, uncontaminated item corresponding to those to be analyzed.

In the above mentioned embodiments continuous movement of the item/location through the instrument is preferred.

Figure 10:
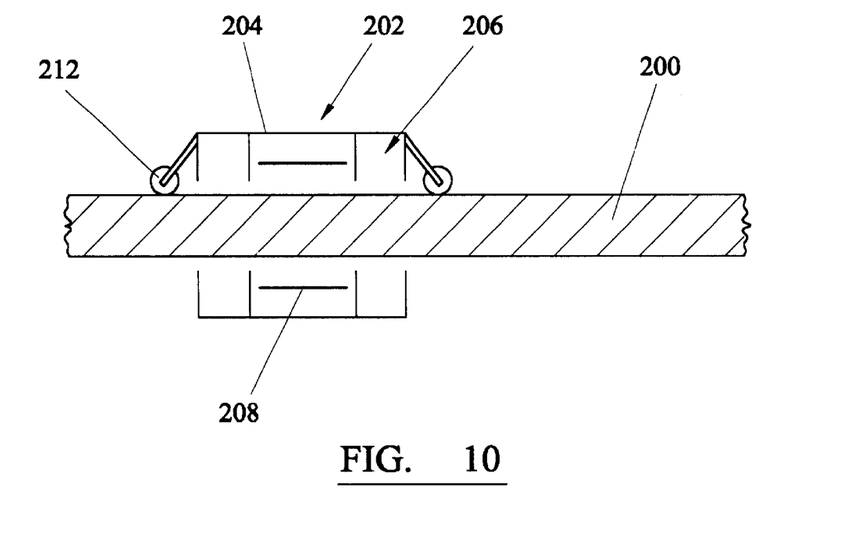
FIG. 10 illustrates an instrument according to a still further embodiment of the invention.

Whilst the system has been discussed in this embodiment in relation to a fixed instrument through which the elongate item is moved, for instance on a conveying roller bed, the instrument is equally applicable to the embodiment of FIG. 10 in which the instrument itself moves.

In this embodiment an elongate item 200, for instance a railway rail, is being analyzed by an instrument 202 formed of a first measuring cylinder portion 204 and air excluding body portions 206. As with the first embodiment of the invention the measuring cylinder 204 is provided with a cylindrical electrode 208 to detect ions generated by alpha particle emission whilst within the cylinder 204.

The entire instrument is supported on the item to be monitored 200 by wheels 212 which can be driven to advance the unit along the item 200. Signals from the instrument 202 relating to its position and the level of alpha detection are sent to a remote monitoring unit, not shown.

Once again, this embodiment of the invention may also include a grid between the electrode 208 and the item 200 so as to minimize capacitance variation effects on the detecting currents.

The embodiments of the invention described above address alpha particle determinations but it is perfectly possible to incorporate gamma and/or beta detectors in such an instrument alternatively or additionally. Beta detection can be undertaken directly or alternatively by calculation from the gamma emissions recorded.

This type of monitoring renders full analysis of long items (10 meters+) possible, whilst avoiding the cost and practical difficulties of enclosing large items, and facilitating continuous fed of the item through the monitor. The instrument is suitable for items such as cables, wires, beams, pipes, rails, indeed any item or location having a conductivity capable of carrying the currents involved.

The instrument also provides spatial information as to the location and/or spread of any alpha emitting sources present.

What is claimed is:

1. An instrument for detecting ions originating from a monitored location, the instrument comprising:
   a body portion at least partially bounding a chamber, the chamber being configured to at least partially cover the monitored location;
   at least one electrode at least partially disposed within the chamber, the at least one electrode being adapted to receive an electrical potential relative to the monitored location;
   at least one electrically conducting element provided with one or more apertures, the at least one electrically conducting element being disposed between the at least one electrode and the monitored location; and
   means for monitoring ions discharged on the at least one electrode.

2. An instrument according to claim 1 in which the at least one electrically conducting element is provided with greater than 80% of its effective area as apertures.

3. An instrument according to claim 1 in which the at least one electrically conducting element is in the form of a grid.

4. An instrument according to claim 1 in which the at least one electrically conducting element is at a potential different to the potential to the monitoring location.

5. An instrument according to claim 1 in which the at least one electrically conducting element is earthed.

6. An instrument according to claim 1 in which the configuration of the at least one electrically conducting element mirrors that of the at least one electrode.

7. An instrument according to claim 1 wherein the body portion comprises a hood so that the chamber has an opening exposed to the environment.

8. An instrument according to claim 7 in which the opening has a perimeter that is provided with a laterally extending flange.

9. An instrument according to claim 1 further comprising an additional detector to detect background ion levels, the additional detector comprising a second electrode and a second apertured element, the second electrode being separated from the at least one electrode by a guard plate.

10. An instrument according to claim 1, wherein the at least one electrically conducting element is adapted to be grounded or have an electrical potential relative to the monitored location that is less than the electrical potential of the at least one electrode relative to the monitored location.

11. An instrument according to claim 1 further comprising means for moving the instrument relative to the monitored location.

12. An instrument according to claim 1 in which the instrument is moved relative to the monitored location as a vehicularized instrument.

13. An instrument according to claim 1 in which the monitored location is the location itself.

14. A method of detecting ions originating from a monitored location, the method comprising:
   positioning an ion detecting instrument adjacent to a monitored location, the monitored location emitting radiation that produces ions in the surrounding environment, the ion detecting instrument comprising:
at least one electrode; and
at least one electrically conducting element having at least one aperture extending therethrough, the at least one electrically conducting element being disposed between the at least one electrode and the monitored location;
applying an electrical potential to the at least one electrode relative to the monitored location so that at least some of the ions produced by the radiation travel to the at least one electrode by passing through the at least one aperture of the electrically conducting element; and
monitoring the discharge of ions on the at least one electrode.

15. A method according to claim 14 further comprising moving the monitored location relative to the instrument.

16. A method according to claim 14 further comprising moving the instrument relative to the monitored location.

17. A method according to claim 14 further comprising:
moving the instrument from the first monitored location to a second monitored location; and
monitoring the discharge of ions on the at least one electrode at the second monitored location.

18. A method according to claim 14 in which the monitored location is an item provided at the location.

19. A method according to claim 14 in which the monitored location is the location itself.

20. A method according to claim 14 in which the monitored location is an item provided at a location.

21. A method according to claim 14 wherein the at least one electrically conducting element is grounded or has an electrical potential relative to the monitored location that is less than the electrical potential of the at least one electrode relative to the monitored location.

22. An instrument for detecting ions originating from a monitored location, the instrument comprising:
a body portion and one or more electrodes at an electrical potential relative to the monitored location;
one or more electrically conducting element(s) provided with one or more apertures, the element(s) being provided between the electrode(s) and the monitored location;
means for monitoring ions discharged on the electrode(s); and
an additional detector provided in the instrument to detect background ion levels, the additional detector comprising an electrode and an apertured element, the additional detector electrode being separated from the electrode by a guard plate.

23. An instrument for detecting ions originating from a monitored location, the instrument comprising:
a body portion at least partially bounding a chamber, the chamber being configured to at least partially receive the monitored location;
at least one electrode at least partially disposed with the chamber, the at least one electrode being adapted to receive an electrical potential relative to the monitored location;
at least one electrically conducting element provided with one or more apertures, the at least electrically conducting element being disposed between the at least one electrode and the monitored location; and
means for monitoring ions discharged on the at least one electrode.

24. An instrument according to claim 23 further comprising means for moving the monitored location past the instrument.

25. An instrument according to claim 23 in which the monitored location is moved relative to the instrument by a roller bed or conveyer.

26. An instrument according to claim 23 in which the at least one electrically conducting elements is provided with greater than 80% of its effective area as apertures.

27. An instrument according to claim 23 in which the at least one electrically conducting element is in the form of a grid.

28. An instrument according to claim 23 in which the at least one electrically conducting element is at a potential different than the potential to the monitored location.

29. An instrument according to claim 23 in which the at least one electrically conducting element is earthed.

30. An instrument according to claim 23 in which the configuration of the at least one electrically conducting element mirrors that of the at least one electrode.

31. An instrument according to claim 23 in which the body portion completely encloses the chamber and is provided with an inlet and an outlet, the monitored location passing through the chamber.

32. An instrument according to claim 23 wherein the body portion comprises a hood so that the chamber has an opening exposed to the environment.

33. An instrument according to claim 32 in which the opening has a perimeter that is provided with a laterally extended flange.

34. An instrument according to claim 23 further comprising an additional detector to detect background ion levels, the additional detector comprising a second electrode and a second apertured element, the second electrode being separated from the at least one electrode by a guard plate.

35. A method of detecting ions originating from monitored location, the method comprising:
positioning an ion detecting instrument adjacent to a first monitored location, the first monitored location emitting radiation that produces ions in the surrounding environment, the ion detecting instrument comprising:
at least one electrode; and
at least one electrically conducting element having at least one aperture extending therethrough, the at least one electrically conducting element being disposed between the at least one electrode and the monitored location;
applying an electrical potential to the at least one electrode relative to the first monitored location so that at least some of the ions produced by the radiation travel to the at least one electrode by passing through the at least one aperture of the electrically conducting element;
monitoring the discharge of ions on the at least one electrode with the first monitored location presented to the instrument;
presenting the ion detecting instrument adjacent to a second monitored location spaced apart from the first monitored location;
applying an electrical potential to the at least one electrode relative to the second monitored location so that at least some of the ions produced by the radiation travel to the at least one electrode by passing through the at least one aperture of the electrically conducting element; and
monitoring the discharge of ions on the at least one electrode with the second monitored location presented to the instrument.

* * * * *